United States Patent
Saad et al.

(10) Patent No.: US 12,216,778 B2
(45) Date of Patent: Feb. 4, 2025

(54) DISTRIBUTING DATA AMONGST STORAGE COMPONENTS USING DATA SENSITIVITY CLASSIFICATIONS

(71) Applicant: EMC IP Holding Company LLC, Hopkinton, MA (US)

(72) Inventors: Yossef Saad, Ganei Tivka (IL); Itay Glick, Ramat Hasharon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 567 days.

(21) Appl. No.: 16/743,863

(22) Filed: Jan. 15, 2020

(65) Prior Publication Data

US 2021/0216657 A1 Jul. 15, 2021

(51) Int. Cl.
*G06F 21/62* (2013.01)
*G06F 3/06* (2006.01)
*G06F 11/14* (2006.01)
*G06F 16/13* (2019.01)
*G06N 20/00* (2019.01)

(52) U.S. Cl.
CPC ........ *G06F 21/6218* (2013.01); *G06F 3/0623* (2013.01); *G06F 3/065* (2013.01); *G06F 3/0659* (2013.01); *G06F 3/067* (2013.01); *G06F 11/1451* (2013.01); *G06F 16/13* (2019.01); *G06N 20/00* (2019.01); *G06F 2201/805* (2013.01)

(58) Field of Classification Search
CPC .... G06F 21/6218; G06F 16/13; G06F 3/0623; G06F 3/065; G06F 3/0659; G06F 3/067; G06F 11/1451; G06F 2201/805; G06N 20/00
See application file for complete search history.

(56) References Cited

U.S. PATENT DOCUMENTS

| | | | |
|---|---|---|---|
| 10,108,811 B1 * | 10/2018 | Walker | G06F 21/31 |
| 2010/0262796 A1 * | 10/2010 | Camborde | G06F 11/1458 711/E12.103 |
| 2018/0336210 A1 * | 11/2018 | Bourgeois | G06F 3/0604 |
| 2020/0050769 A1 * | 2/2020 | Bhosale | G06F 16/907 |
| 2020/0320208 A1 * | 10/2020 | Bhosale | G06N 3/08 |
| 2021/0026982 A1 * | 1/2021 | Amarendran | G06F 21/6245 |

* cited by examiner

*Primary Examiner* — Eric Cardwell
(74) *Attorney, Agent, or Firm* — Dergosits & Noah LLP; Todd A. Noah

(57) ABSTRACT

Described is a system for distributing data amongst storage components using data sensitivity (or security) classifications. The system may define categories for classifying data files and assign a sensitivity (or security) rating to each of the defined categories. The categories and/or associated sensitivity ratings may be determined using machine learning components that may leverage industry-specific information or data sensitivity information used by other clients. The system may then continuously reevaluate (or reclassify) data files to determine whether they are stored on a storage component that meets the necessary data sensitivity requirements. If the system determines particular data files are stored on a corresponding storage component that does not meet certain data sensitivity requirements, the system may perform an action to secure the particular data files.

20 Claims, 5 Drawing Sheets

| 300 | 302 | 304 |
|---|---|---|
| | Category | Data Sensitivity Rating |
| | OS / System File | 10 |
| | Marketing Material / Public Info. | 20 |
| | Binaries of User-Developed Apps | 160 |
| | Source Code | 180 |
| | Personal Data | 200 |
| | Medical Records | 240 |

FIG. 3

| 400 | 402 | 404 | 406 |
|---|---|---|---|
| | Storage Component Device | Sensitivity Capability | Security Class |
| | ST-100 | ≤ 255 | Extra High |
| | ST-200 | ≤ 150 | High |
| | ST-300 | ≤ 100 | Regular |

FIG. 4

DISTRIBUTING DATA AMONGST STORAGE COMPONENTS USING DATA SENSITIVITY CLASSIFICATIONS

TECHNICAL FIELD

This disclosure relates to data storage systems, and more particularly, distributing data amongst storage components of a storage system using data sensitivity classifications.

BACKGROUND

Data storage systems (or on-demand storage services) may provide various tools that are crucial for enterprise level network clients. For example, clients may rely on such systems to efficiently back up and recover data in the event of user error, data loss, system outages, hardware failure, or other catastrophic events to allow business applications to remain in service or quickly come back up to service. In addition, as part of a data storage service, providers may provide tools for storing data based on various security needs. For example, a storage service may direct the distribution of certain sensitive data to particular storage hardware. Often, the storage service relies on a backup application to write data to particular storage hardware. However, the backup application may be configured in a manner that is independent from an overarching data security policy that may be implemented by a client or the storage system provider. For example, a backup administrator that configures backup profiles for distributing data may not be familiar with security policies for specific clients. Moreover, clients of different industries may assign different security profiles to the same types of data. Consequently, data security measures may not always be implemented correctly at the time of an initial backup. Accordingly, there is a continued need to implement data distribution policies within storage systems that account for various data sensitivity requirements.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIG. 3 shows a diagram illustrating an example table showing a set of categories for classifying data files and the associated data sensitivity ratings according to one or more embodiments of the disclosure.

FIG. 4 is a diagram illustrating an example table showing a set of storage components and associated data sensitivity capabilities according to one or more embodiments of the disclosure.

DETAILED DESCRIPTION

Figure 1:
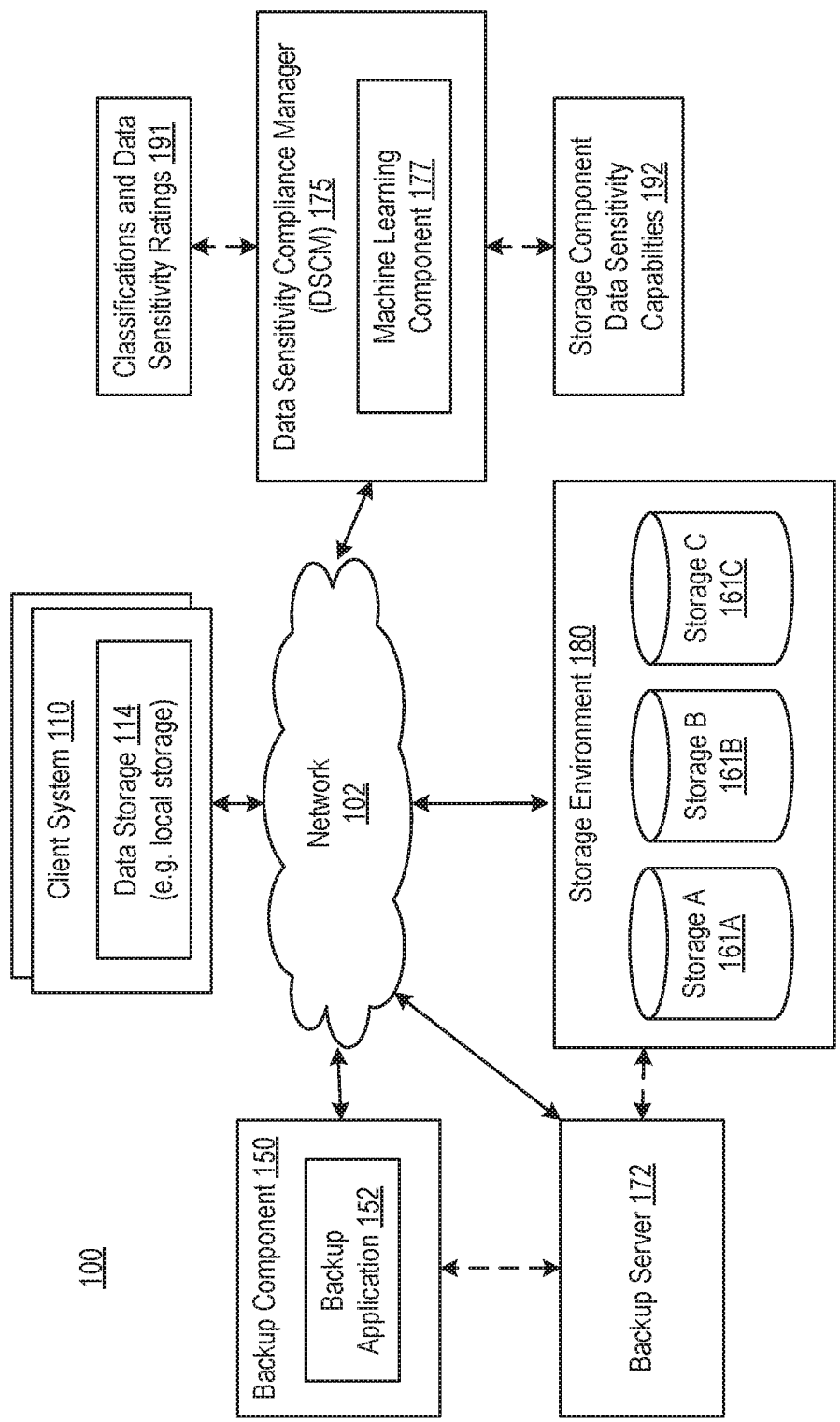
FIG. 1 is a block diagram illustrating an example operating environment for securing data using data sensitivity classifications according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for distributing data amongst storage components using data sensitivity (or security) classifications. For example, the storage components may store data files within a storage system as part of a data protection and backup service. Accordingly, after data is initially stored amongst the storage components, for example, by a backup application that provides part of the backup service, the system may continuously reevaluate (or reclassify) data files to determine whether they are stored on a storage component that meets the data sensitivity requirements of the data files. For example, if the system determines particular data files are stored on a corresponding storage component that does not meet certain data sensitivity requirements, the system may perform proactive measures to secure the particular data files.

To provide such a capability, the system may create a data distribution policy as part of an initialization process. For example, the initialization process may include defining categories for classifying data files and assigning a sensitivity (or security) rating for each of the defined categories. In some embodiments, the categories and/or associated sensitivity ratings may be determined using machine learning (or artificial intelligence) components that may leverage industry-specific information or regulations, as well as data sensitivity information used by other clients. The system may then compare the data sensitivity ratings associated with a data file with a data sensitivity capability associated with a particular storage component that stores that data file. For example, storage components with different network attributes (e.g. on-premises vs. off-premises) may be associated with different data sensitivity capabilities. Accordingly, if a particular storage component does not meet the specified data sensitivity requirements associated with a data file, the system may perform one or more operations to secure the data file. For example, the system may perform a determination to identify a different storage component that meets the data sensitivity requirements, and initiate a process to move such data files to the identified storage component. In addition, the system may perform additional operations to secure data files such as encrypting or preventing access to particular data files.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes backup and disaster recovery services. For example, at least some functionality may be provided by, or implemented in connection with, various platforms such as the Data Domain™ data protection platform provided by Dell EMC™ Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, hardware (e.g. Solid State Drive (SSD), Hard Disk Drive (HDD)), or on virtual storage systems provided by a cloud service provider, etc.

More specifically, and with reference to FIG. 1, shown is a block diagram illustrating an example of an operating environment 100 for distributing data using data sensitivity classifications according to one or more embodiments of the disclosure. As shown, the environment 100 may include a client system 110, backup component 150, backup server 172, a storage environment 180, and a data sensitivity compliance manager 175. It should be noted that the components of operating environment 100 may interact via a network 102, which may be any type of wired or wireless network including a local area network (LAN), a storage area network (SAN), a wide area network (WAN), or a direct communication link, or other suitable connection.

As shown, the operating environment 100 may include a client or client system (or computer, or device) 110 that may be associated with a client (or customer) of a data backup and protection service, and a backup component 150 that may be associated with a data backup and protection service provider. In some embodiments, different clients may be associated with a different client system 110. The client system 110 may provide computing resources (e.g. webservers, databases, etc.) for users (e.g. website visitors) of the client, data from which may be protected by the backup and data protection service provider. Accordingly, the client system 110 may act as a client from which backups are performed. In some embodiments, the client system 110 may comprise a virtual machine. In addition, the client system 110 may host one or more client applications 112, and may include data storage 114, as well as an interface for communicating with other systems and devices, such as the backup component 150. In general, the client applications 112 may create new and/or modified data that is desired to be protected. As such, the client system 110 is an example of a host device.

In one embodiment, backup component 150 may represent one or more components of a Data Domain™ Restorer (DDR)-based deduplication storage system, and backup server 172 may be implemented in conjunction with a Data Domain deduplication storage server provided by Dell/EMC™ Corporation for use with DDR storage devices. For example, the backup server 172 may be a stand-alone entity, or can be an element of the backup component 150. In some embodiments, the backup server 172 may be an EMC Corp. Avamar server or an EMC Corp. Networker server, although no particular server is required, and other backup and storage system configurations are contemplated.

The backup component 150, may include a backup application 152 that performs (or manages, coordinates, etc.) the creation and restoration of data that may be backed-up. For example, data to be backed-up from the client system 110 may be communicated from the client system 110 to the backup application 152 for initial processing, after which the processed data is uploaded from the backup application 152 for storage within the storage environment 180. In some embodiments, the backup application 152 may cooperate with a backup client application of the client system 110 to back up client data to the storage environment 180. A backup application 152 may also cooperate with a backup client application to restore backup data from the storage environment 180 to the client system 110. In some embodiments, the backup application 152 may be a part of, or work in conjunction with, a storage appliance. For example, the storage appliance may include a Dell-EMC CloudBoost appliance, although any suitable appliance is contemplated. In addition, the backup application 152 may provide a variety of useful functionalities such as source-side data deduplication, data compression, and WAN optimization boost performance and throughput while also possibly reducing the consumption and cost of network bandwidth and cloud storage capacity. One, some, or all, of these functions of the backup application 152 may be performed using deduplication logic. It should be noted that the backup component 150 or backup application 152 can be implemented in various forms, such as a virtual, physical, or native public cloud appliance to fit the requirements of a particular configuration, and the backup application 152 can be used with various types of data protection environments, including public and private object storage clouds.

The storage environment 180 may store data files (or data, files, backup data, backup files, etc.) within a set of storage components 161. For example, the storage of data files may be configured to store client system 110 data backups that can be restored in the event of a data loss. As shown, the storage components 161 may include different types of storage components shown as storage component A 161A, storage component B 161B, and storage component C 161C. Each of the storage components 161 may be associated with different attributes such as network or device attributes. For example, storage component A 161A may be part of a local (or on-premises) hardware, while storage component B 161B may be hosted by a cloud-based (e.g. on-demand) storage service provider. Accordingly, the network attributes (e.g. attributes associated with the hosting network) for storage component A 161A may be different than the network attributes for storage component B 161B. As another example, the hardware or physical components of storage component B 161B may be different than those of storage component C 161C. Accordingly, the device attributes (e.g. attributes identifying device hardware) for storage component B 161B may be different than the device attributes for storage component C 161C. In addition, in some embodiments, one or more storage components 161 may be provided by a different entity (or provider, vendor, company, organization, etc.), and therefore, may be associated with different attributes. The storage environment 180 may also store metadata for (or associated with) the data files, and one or more instances of a filesystem that catalogs data files residing in the storage environment 180.

As shown, a Data Security Compliance Manager (DSCM) 175 may interact with storage environment 180. For example, as further described herein, the DSCM 175 may initialize a data distribution policy, scan data files stored one or more storage components 161, and secure any data files as necessary based on data sensitivity classifications. In some embodiments, the DSCM 175 may work in conjunction with a machine learning component 177. For example, the machine learning component (or process, encoding, etc.) 177 may receive various inputs and output information used by the DSCM 175. For example, such information may include categories for classifying data and assigned data sensitivity ratings. These data sensitivity mappings may be stored as part of the Classifications and Data Sensitivity Ratings (data sensitivity ratings) 191. When securing data, the DSCM 175 may also determine whether particular data files are stored on storage components with adequate data sensitivity capabilities. These capability mappings may be stored as part of the Storage Component Data Sensitivity Capabilities (data sensitivity capabilities) 192. The data sensitivity ratings 191 and the data sensitivity capabilities 192 may be one or more, combined or separate, data structures (including a database) that may store information as further described herein, for example, as a table. In some embodiments, the machine learning component 177 may be provided as part of an on-demand service (e.g. software as-a service) that is accessed by components of the operating environment 100 such as the DSCM 175.

Figure 2:
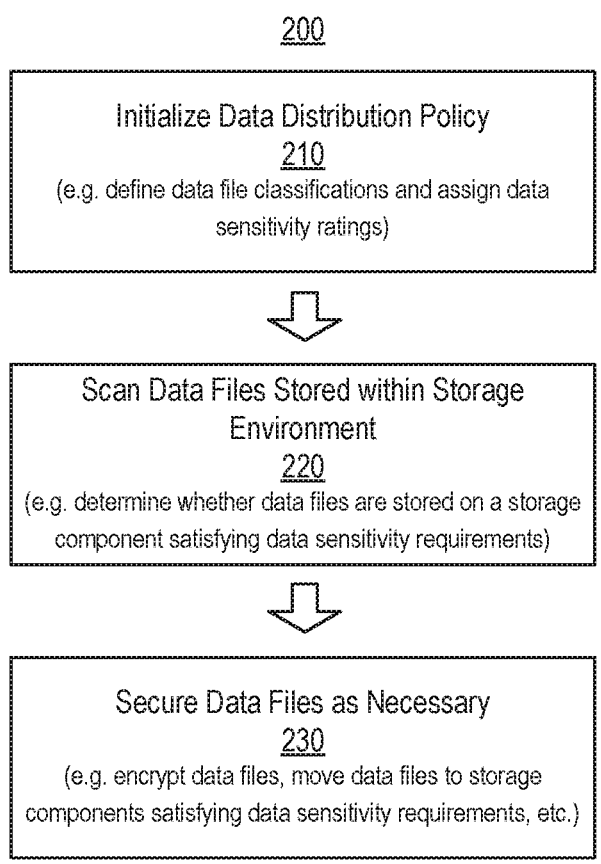
FIG. 2 is a block diagram illustrating an example process flow for initializing a data distribution policy and securing data files based on data sensitivity requirements according to one or more embodiments of the disclosure.

FIG. 2 is a block diagram 200 illustrating an example process flow for initializing a data distribution policy and securing data files based on data sensitivity classifications according to one or more embodiments of the disclosure.

In some embodiments, the process may be performed by a system (e.g. DSCM 175). As shown, in 210, the system may initialize a data distribution policy. In some embodiments, the data distribution policy may be associated with a particular client of a data backup and protection service. For example, the initialization process may establish classifications for data and associated data sensitivity ratings. More particularly, the initialization may include categorizing (or defining) classifications for data files (or data) stored within a storage environment (e.g. storage environment 180) and determining a sensitivity (or security) rating (or level, value, category, tier, etc.) mapped to (e.g. associated with) each of the defined categories. In some embodiments, the categories and/or associated sensitivity ratings may be determined using machine learning (or artificial intelligence) components. For example, the machine learning component may use various inputs such as industry-specific information or regulations, information obtained from mappings used by other clients, as well as any other information that may be leveraged to provide improved results for creating a data distribution policy. Accordingly, the data distribution policy may be created manually (e.g. defined by a security administrator), semi-automatically (e.g. defined by the security administrator in response to receiving recommendations from the machine learning component), or automatically (e.g. defined by the machine learning component). In some embodiments, the machine learning component may be provided as part of an on-demand service (e.g. software-as-a-service) that stores and maintains the data structures that store the mappings. For instance, the mappings may be stored as a table as shown in the example of FIG. 3.

FIG. 3 shows a diagram 300 illustrating an example table (e.g. data sensitivity ratings 191) showing a set of categories for classifying data files and the associated data sensitivity ratings according to one or more embodiments of the disclosure.

As shown, the system may define a set of categories (or classifications, data types, groupings, etc.) 302, and each of the categories may be associated with (or mapped to) a sensitivity rating (or level, value, category, tier, etc.) 304. In this example, the data sensitivity rating 304 may be specified as a value (e.g. integer) within a predefined range. For instance, in this example, the sensitivity rating may be an integer between the range of 0-255, although any other range is contemplated. For example, the higher the data sensitivity rating, the greater degree to which the data should be protected from unauthorized access. For example, as shown, personal data and medical records have a significantly higher data sensitivity rating than marketing material/public information. Therefore, the system may invoke additional security measures (e.g. writing such data to particular storage components) for the personal data and medical records. It should be noted that any measuring, classification, ranking, weighting, or combination thereof, may be used to define a sensitivity rating. For example, a classification system may be used that specifies a sensitivity rating as high, medium, or low, other form of categorization or tiering.

In addition, the system may determine a data sensitivity (or security) capability (or class, range, level, value, rating, tier, category, etc.) mapped to (e.g. associated with) storage components within the storage system that store the data files. For instance, the mappings may be stored as a table as shown in the example of FIG. 4.

FIG. 4 shows a diagram 400 illustrating an example table (e.g. data sensitivity capabilities 192) showing a set of storage components (e.g. storage components 161A-C) and associated data sensitivity capabilities (or class, range, level, value, rating, tier, category, etc.). In this example, the data sensitivity capability 404 may be specified as a range (e.g. less than or equal to a value) corresponding to the range of data sensitivity ratings (e.g. 0-255 as described in the example of diagram 300). For instance, in this example, the data sensitivity capability of device type ST-100 includes data with a data sensitivity rating up to, an including, a value of 255. For example, device type ST-110 would be capable of storing personal (e.g. rating of 200) and medical records (rating of 240) from the example of diagram 300, whereas device type ST-200 (e.g. having a data sensitivity capability of less than or equal to 150) would not be capable of storing such data. Accordingly, the higher the data sensitivity capability, the greater degree of security provided to data stored by the component. As further described herein, the data sensitivity capability assigned to a storage component may be based on device attributes (e.g. device type) as well as additional factors such as network attributes (e.g. secure vs. public network). In addition, as shown, storage components may also be associated with a security class 406. For example, the storage component may also be grouped (or tiered, classified, categorized, etc.) based on the data sensitivity capability. It should be noted that any measuring, classification, ranking, weighting, or combination thereof, may be used to define a data sensitivity capability.

Returning to FIG. 2, in 220, the system may scan (or monitor, analyze, traverse, etc.) the storage components to determine whether data files are stored on an appropriate storage component. In some embodiments, an appropriate storage component indicates the storage component has a sensitivity capability that corresponds to (or matches, satisfies, adheres to, etc.) the data sensitivity ratings of the data files which its stores.

In some embodiments, the system may perform such a scan or monitoring on a continuous basis to ensure that sensitive data that is stored within the data files remain secure within the storage environment. For example, a backup application may direct the initial storage of data to certain storage components using an initial set of criteria that may include a limited (or incomplete) amount of information, or information that may prioritize resource considerations of a storage component (e.g. bandwidth, storage capacity, cost, etc.). Accordingly, after data is initially stored amongst the storage components, for example, by the backup application, the storage system may continuously reevaluate (or reclassify) data files to determine whether they are stored on an appropriate storage component. For example, the system may use a subsequent (or second) set of criteria to reevaluate data files to provide a more thorough or complete analysis of potential data sensitivity requirements. For example, data sensitivity requirements of generations of backup data may change or become apparent from additional information that is acquired. For instance, certain data may warrant an initial categorization (e.g. relatively low data sensitivity rating) based on how a particular client application uses such data. However, over time, the particular client application may use such data in a different manner that warrants a subsequent categorization (e.g. relatively high data sensitivity rating). Accordingly, the system may perform a continuous process to redistribute data as necessary to ensure storage security requirements are satisfied.

In 230, the system may secure data files as necessary in response to performing a scan of the storage components. For example, the system may perform one or more operations (or actions, processes, etc.) to secure particular data files, if the system determines particular data files are stored on a corresponding storage component that does not meet the data sensitivity requirements of the particular data files. In some embodiments, the system may perform a combination of various operations to secure a data file. For example, the system may perform a determination to identify a different storage component that meets the data sensitivity requirements of a particular data file, and then initiate a process to move such data files to the identified storage component. In some embodiments, moving the data file to a particular storage component may include initiating a backup application to reinitiate a backup process which then redirects storage of particular data to the identified storage component. For instance, the system may provide an indication to a backup application (e.g. via an API) that redefines the backup target to another storage component and reinitiates the backup process. As another example of securing a data file, the system may transmit a notification to a particular user (e.g. administrator) or component in order to prompt further action (e.g. an action performed by an administrator to secure the data file). As another example, the system may prevent access to the particular data files. For instance, the system may delete or otherwise make a particular data file inaccessible (e.g. quarantine such a file). As yet another example, the system may encrypt particular data files or storage components in order to secure data files.

Figure 5:
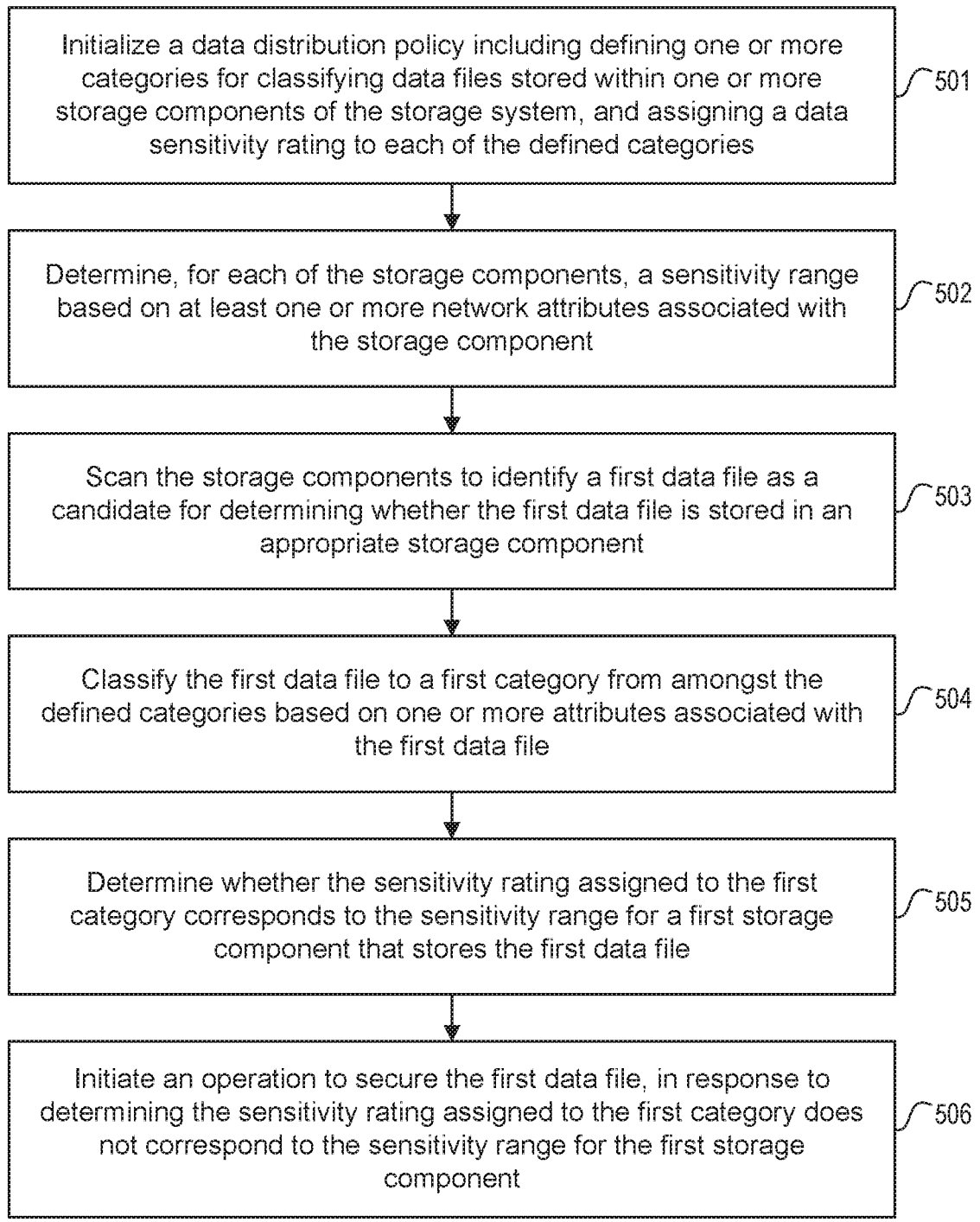
FIG. 5 is a flow diagram illustrating an example method of securing data using data sensitivity classifications according to one or more embodiments of the disclosure.

FIG. 5 is a flow diagram 500 illustrating an example method of distributing data using data sensitivity classifications according to one or more embodiments of the disclosure. Process 500 may use processing logic, which may include software, hardware, or a combination thereof. For example, process 500 may be performed by a system including one or more components described in operating environment 100.

In 501, the system (e.g. DSCM 175) may initialize a data distribution policy for a first client (e.g. a first client system 110) of a storage (e.g. storage environment 180). In some embodiments, the initialization may include defining one or more categories (e.g. categories 302) for classifying data files stored within one or more storage components (e.g. storage components 161) of the storage system. In addition, the initialization may include assigning a data sensitivity (or security) rating (or level, value, category, tier, etc.) to each of the defined categories (e.g. data sensitivity rating 304). As described, the data distribution policy or a set of data files may be associated with a first client (e.g. a first client system 110) of the storage system (or data protection and backup service).

In some embodiments, initializing the data distribution policy may include leveraging a machine learning component (e.g. machine learning component 177). In some embodiments, the machine learning component may be provided as part of an on-demand service (e.g. software as-a service). Accordingly, in some embodiments, the initializing may include providing, as part of a set of inputs for a processing performed by a machine learning component, attributes associated with the data files stored by the storage system. In response, the system may receive, as part of a set of outputs from the processing performed by the machine learning component, the one or more defined categories for classifying data files stored within one or more storage components of a storage system. In some embodiments, the set of outputs may also include the assigned data sensitivity ratings for each of the defined categories.

In some embodiments, the initialization may include providing recommendations from the machine learning component to a user (e.g. an administrator). Accordingly, in some embodiments, the set of outputs from the processing performed by the machine learning component may be provided as part of a recommended set of categories or a recommended set of data sensitivity ratings. For example, the recommendations may be presented to the user for modification or confirmation. In response to any input provided by the user, the system may then create the necessary mappings, which may be stored within a data structure (e.g. data sensitivity ratings 191). Accordingly, the system may create a data structure (e.g. table of diagram 300) to store the defined categories along with the associated (or mapped) data sensitivity ratings assigned to each of the defined categories. The data structure may be continually updated in response to dynamically updating the categories or data sensitivity ratings (e.g. via the machine learning component). Accordingly, the system may access such data structure to obtain a data sensitivity rating for a particular category. The data structure may be stored locally by the system (e.g. storage environment 180), or may be stored as part of an on-demand service.

The machine learning component may utilize various inputs to determine one or more of the defined categories and associated sensitivity ratings. For example, different industries (or entity types) may warrant different sensitivity ratings for the same type of data. Accordingly, to account for such variances (or differences) the system may input data associated with the type of industry associated with a client that is the source data of the data stored within the data files. For example, data from documents that are associated with a client that is within the legal industry may have a higher sensitivity rating than documents that are associated with a client that, for example, provides publicly available documents. Accordingly, in some embodiments, the system may also provide, as part of the set of inputs for the processing performed by the machine learning component, an identifier (or other type of data) for an industry associated with the first client of the storage system. For example, the industry identifier may be associated with the source of the data stored within the data files.

In another example, information used by a second client (e.g. a second client system 110) of the storage system to classify data files may be used as input to the machine learning component. Accordingly, in some embodiments, the set of inputs for the processing performed by the machine learning component may include one or more categories for classifying a different set of data files used by a second client of the storage system. The set of inputs may also include data sensitivity ratings used by the second client associated with the storage system.

It should be noted that the information used as input to the machine learning process may also be used to train the machine learning component. For example, classifications and assigned data sensitivity ratings used by a second client (e.g. within the same industry as the first client) may be used to train the machine learning component.

In 502, the system may determine, for each of the storage components, a sensitivity (or security) capability (or class, range, level, value, rating, tier, category, etc.) based on at least one or more network or device attributes associated with the storage component (e.g. each respective storage component). For example, the system may determine a data sensitivity capability (e.g. data sensitivity capability 404) for a first and second storage component based on at least one or more attributes associated with the first and second storage component respectively.

The network attributes may include the type of network to which a particular storage component (or device) resides. For example, a storage component that is hosted (or resides) on an on-demand (e.g. cloud-based service) or off-premises network may be associated with a lower sensitivity capability than a storage component hosted on a local or on-premises network. As another example, a storage component that may be accessible from a public network may be associated with a lower sensitivity capability than a storage component secured within a private or isolated network. Accordingly, in one embodiment, the network attribute may indicate whether the storage component is hosted on a secure network.

The device attributes may include an identifier for whether the storage component (or device) is a virtual (or software-defined) storage component vs. a physical (or physically-defined) component (or device). For example, a virtual storage component may be associated with a different sensitivity capability than a particular physical device. The device attributes may also define physical characteristics of the storage component. For example, certain types or models of physical devices may be associated with different security characteristics, and therefore, may in turn be associated with different sensitivity capabilities.

In some embodiments, determining the sensitivity capability for a storage component may be an automated (fully or partially) process initiated by the system. For example, the system may automatically determine the attributes (e.g. network, device, etc.) associated with a storage component. For example, the system may automatically determine network attributes of a storage component by retrieving network address information associated the storage component. In addition, the system may receive information from a user (e.g. admin) that may specify particular attributes associated with a storage component. For example, a user may manually specify attributes associated with a storage component (e.g. type of component, host network, etc.) that are used to determine the sensitivity capabilities.

It should be noted that in some embodiments, determining the sensitivity capability for a storage component may be performed as part of the initialization process of 501.

In 503, the system may scan (or monitor) the storage components to identify a first data file as a candidate for determining whether the first data file is stored in an appropriate storage component. In some embodiments, the system may perform such a scan as part of a scheduled maintenance routine. In addition, the system may perform such a scan of part of a monitoring service that identifies the candidate data file in response to certain criteria. For example, a data file may be identified as a candidate in response to being updated. As another example, the data file may be identified as a candidate in response to other criteria (e.g. size, source, data type, dates, etc.) that the system may use to infer whether the data file may need to be reclassified. Accordingly, the system may continuously determine whether the data files are stored on an appropriate storage component.

In 504, after identifying the first data file, the system may classify (or reclassify) the first data file to a first category from amongst the defined categories (e.g. categories 302) based on one or more attributes associated with the first data file. For example, as described, the system may reclassify and redistribute data files to more accurately store data in a suitable storage component. For example, as new information related to data is obtained, the system may reclassify the data as necessary, and as a result of such reclassification, the system may determine whether a data file is stored on an appropriate storage component. For example, the system may perform any necessary actions to maintain the security of such data files.

When classifying (or reclassifying) data files, the system may retrieve and analyze (or parse) attributes associated with data stored within the data file, or the data file itself. For example, the attributes may include information based on a file extension, text from natural language processing, metadata, or a combination thereof.

Accordingly, in some embodiments, classifying the first data file to the first category based on one or more attributes associated with the first data file may include determining, as at least one of the attributes, a file extension of a file associated with data stored within the first data file. For example, the system may analyze data of the first data file to determine the data originates from a file (e.g. stored on client system 110) with a particular file extension. For instance, the system may infer the file type of the original file was a document based on the file extension (e.g. doc, txt, pdf, etc.), a binary or executable file (e.g. bin, exe, etc.), or any other file type. For example, the system may determine the original file is a medical record based on a proprietary file extension associated with, for example, a medical record management platform.

Classifying the first data file may also include performing a natural language processing of text of data stored within the first data file to obtain at least one of the attributes. For example, the system may parse the text of the data stored within the first data file to infer the type of data. For instance, a natural language processing may be performed using the text to determine whether the original file contained confidential information from various sources such as emails, memos, reports, or other potentially confidential documents.

In addition, classifying the first data file may include parsing metadata associated with the first data file to obtain at least one of the attributes. For example, the metadata associated with data files may contain information that allows the system to infer the type of data stored within the data file. For instance, information such as an originating source (e.g. system, application, author, etc.) may be derived from the metadata. For example, the system may determine the data originates from a particular software platform (e.g. system or application associated with medical records management platform), and thus, may contain sensitive information. In addition, a security zone (or security attribute) may also be derived from the metadata.

In 505, the system may determine whether the sensitivity rating assigned to the first category (e.g. data sensitivity rating 304) corresponds to the sensitivity capability for a first storage component (e.g. data sensitivity capability 404) that stores the first data file. For example, the system may retrieve the sensitivity ratings assigned to the first category from a data structure storing the ratings (e.g. data sensitivity ratings 191) and compare them with the data sensitivity capability for the first storage component that may be retrieved from a data structure storing such capabilities (e.g. data sensitivity capabilities 192).

In 506, the system may initiate one or more operations to secure the first data file. For example, the system may initiate the operation to secure the first data file, in response to determining the sensitivity rating assigned to the first category does not correspond to the sensitivity capability for the first storage component.

In some embodiments, the operation to secure the first data file may include preventing access to the first data file. For example, preventing access to the first data file may include taking the first storage component offline. As another example, preventing access to the first data file may include proactively deleting the data file or securing the data file to prevent exposure (e.g. placing the first data file in quarantine).

In some embodiments, the operation to secure the first data file may include encrypting the first data file, or the first storage component. For example, the system may apply an encryption policy to the first data file or the first storage component to increase the security level of the first data file to a degree that is commensurate with the newly determined data sensitivity rating.

In addition, as part of the operation to secure the first data file, the system may provide one or more notifications to various components or users (e.g., administrators) of the system. For example, a notification indicating a particular data file is stored on a storage component that does not meet a data sensitivity requirement may be provided to a backup administrator or security officer to prompt further action.

In some embodiments, the system may identify an alternative storage component for storing the first data file. For example, in response to determining the sensitivity rating assigned to the first category does not correspond to the sensitivity capability for the first storage component, the system may determine the sensitivity capability for a second storage component corresponds to the sensitivity rating assigned to the first category. Accordingly, the operation to secure the first data file may include storing data of the first data file within the second storage component as a second data file.

In some embodiments, the system may reinitiate a backup process to secure the data. For example, storing data of the first data file within the second storage component as the second data file may include instructing a backup application to resend, to the storage system, the data of the first data file. For example, as part of a data redistribution process, the backup application may direct storage of the data of the first data file to the second data file within the second storage component.

Accordingly, the system may secure data files as necessary based on a dynamic security requirements.

Figure 6:
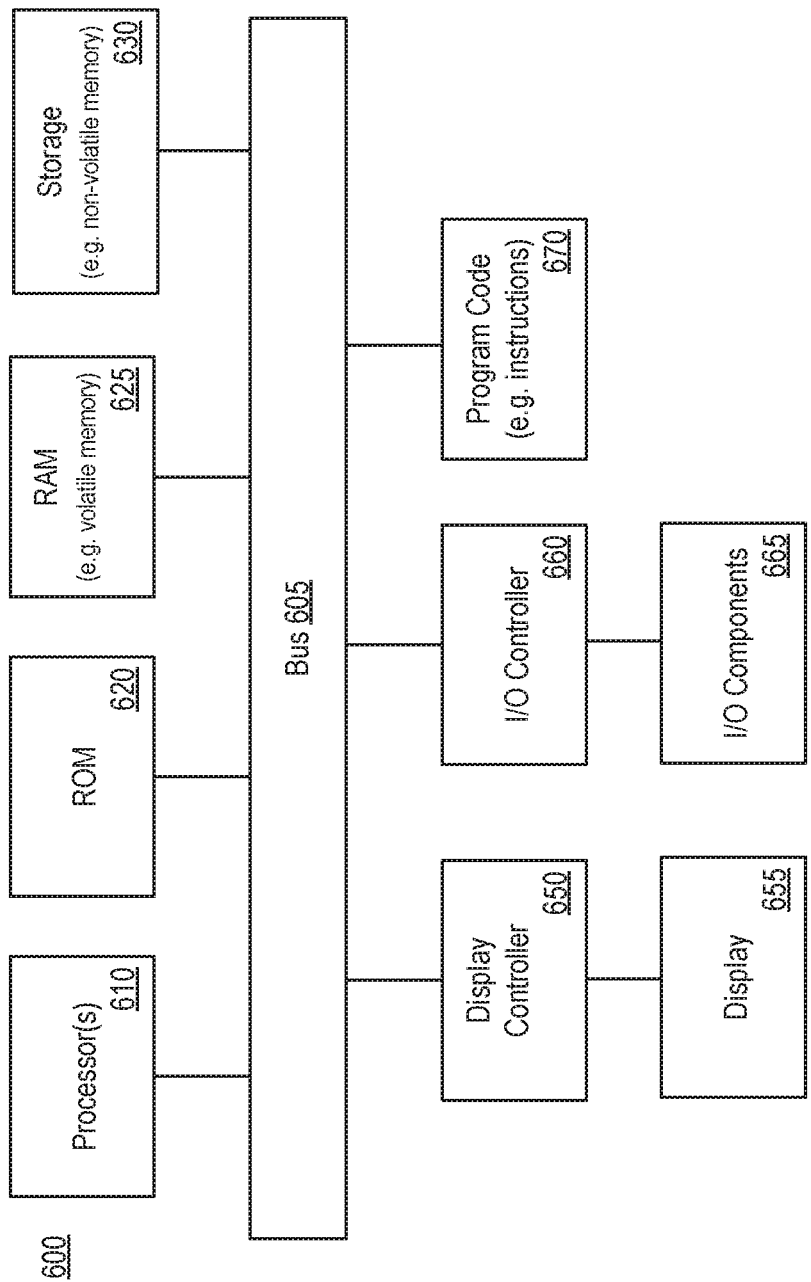
FIG. 6 is a block diagram illustrating an example computing system that may be used in conjunction with one or more embodiments of the disclosure.

FIG. 6 shows a block diagram of an example of a computing system that may be used in conjunction with one or more embodiments of the disclosure. For example, computing system 600 (or system, or server, or computing device, or device) may represent any of the devices or systems (e.g. DSCM 175, storage environment 180, etc.) described herein that perform any of the processes, operations, or methods of the disclosure. Note that while the computing system 600 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 600 may include a bus 605 which may be coupled to a processor 610, ROM (Read Only Memory) 620, RAM (or volatile memory) 625, and storage (or non-volatile memory) 630. The processor(s) 610 may retrieve stored instructions from one or more of the memories 620, 625, and 630 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 610 may perform operations in an on-demand or "cloud computing" environment or as a service (e.g. within a "software as a service" (SaaS) implementation). Accordingly, the performance of operations may be distributed among the one or more processors 610, whether residing only within a single machine or deployed across a number of machines. For example, the one or more processors 610 may be located in a single geographic location (e.g. within a home environment, an office environment, or a server farm), or may be distributed across a number of geographic locations. The RAM 625 may be implemented as, for example, dynamic RAM (DRAM), or other types of memory that require power continually in order to refresh or maintain the data in the memory. Storage 630 may include, for example, magnetic, semiconductor, tape, optical, removable, non-removable, and other types of storage that maintain data even after power is removed from the system. It should be appreciated that storage 630 may be remote from the system (e.g. accessible via a network).

A display controller 650 may be coupled to the bus 605 in order to receive display data to be displayed on a display device 655, which can display any one of the user interface features or embodiments described herein and may be a local or a remote display device. The computing system 600 may also include one or more input/output (I/O) components 665 including mice, keyboards, touch screen, network interfaces, printers, speakers, and other devices. Typically, the input/output components 665 are coupled to the system through an input/output controller 660.

Program code 670 may represent any of the instructions, applications, software, libraries, toolkits, modules, components, engines, units, functions, logic, etc. as described herein (e.g. DSCM 175, machine learning component 177, etc.). Program code 670 may reside, completely or at least partially, within the memories described herein (e.g. non-transitory computer-readable media), or within a processor during execution thereof by the computing system. Program code 670 may include both machine code, such as produced by a compiler, and files containing higher-level or intermediate code that may be executed by a computing system or other data processing apparatus (or machine) using an interpreter. In addition, program code 670 can be implemented as software, firmware, or functional circuitry within the computing system, or as combinations thereof. Program code 670 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
one or more processors; and
a non-transitory computer readable medium storing a plurality of instructions, which when executed, cause the one or more processors to:
initialize a data distribution policy for a first client of a storage system including defining categories for classifying data files stored within one or more storage components of the storage system by analyzing attributes of the data stored within the one or more storage components, and assigning a data security rating to each of the defined categories, each of the categories describing a group of the data files based on a shared attribute of the data files, wherein defining the categories for classifying the data files associated with the first client is based on at least one of an industry associated with the first client, or categories used for a different set of data files associated with a second client of the storage system;
determine, for each of the storage components, a security capability based on at least one or more network attributes or device attributes associated with the storage component, the security capability being associated with accessibility of the storage component and being proportional to a degree of security provided to the data files stored by the storage component, wherein security is associated with unauthorized access;
scan the storage components to identify a stored first data file for reevaluation of whether the first data file is stored in an appropriate storage component having a security capability that corresponds to a data security rating of the first data file, the data security rating being proportional to a degree of protection from unauthorized access for the first data file;
classify the first data file to a first category having an assigned data security rating from amongst the defined categories based on one or more attributes associated with the first data file;
determine whether the data security rating which is assigned to the first category and which specifies a degree of protection required for the first data file against unauthorized access is satisfied by a degree of protection provided against unauthorized access as specified by the security capability for a first storage component that stores the first data file; and initiate an operation to secure the first data file, in response to determining the degree of protection required for the first data file against unauthorized access is not satisfied by the degree of protection provided against unauthorized access as specified by the security capability for the first storage component.

2. The system of claim 1, wherein the plurality of instructions, when executed, further cause the one or more processors to:

determine the security capability for a second storage component corresponds to the data security rating assigned to the first category, in response to determining the data security rating assigned to the first category does not correspond to the security capability for the first storage component, and wherein the operation to secure the first data file includes storing data of the first data file within the second storage component as a second data file.

3. The system of claim 2, wherein the storing data of the first data file within the second storage component as the second data file includes:

instructing a backup application to resend, to the storage system, the data of the first data file, the backup application directing storage of the data of the first data file to the second data file within the second storage component.

4. The system of claim 1, wherein the defining the categories includes:

providing, as part of a set of inputs for a processing performed by a machine learning component, the attributes associated with the data files stored by the storage system; and receiving, as part of a set of outputs from the processing performed by the machine learning component, the defined categories for classifying data files stored within one or more storage components of a storage system, and the assigned data security ratings for each of the defined categories.

5. The system of claim 4, wherein the defining the categories further includes:

providing, as part of the set of inputs for the processing performed by the machine learning component, an identifier for the industry associated with the first client.

6. The system of claim 4, wherein the defining the categories further includes:

providing, as part of the set of inputs for the processing performed by the machine learning component, the categories or data security ratings used for the different set of data files associated with a second client of the storage system.

7. The system of claim 1, wherein the classifying the first data file to the first category based on one or more attributes associated with the first data file includes:

determining, as at least one of the attributes, a file extension of a file associated with data stored within the first data file.

8. The system of claim 1, wherein the classifying the first data file to the first category based on one or more attributes associated with the first data file includes:

performing a natural language processing of text of a file associated with data stored within the first data file to obtain at least one of the attributes.

9. A method comprising:

initializing a data distribution policy for a first client of a storage system including defining categories for classifying data files stored within one or more storage components of the storage system by analyzing attributes of the data stored within the one or more storage components, and assigning a data security rating to each of the defined categories, each of the categories describing a group of the data files based on a shared attribute of the data files, wherein defining the categories for classifying the data files associated with the first client is based on at least one of an industry associated with the first client, or categories used for a different set of data files associated with a second client of the storage system;

determining, for each of the storage components, a security capability based on at least one or more network attributes or device attributes associated with the storage component, the security capability being associated with accessibility of the storage component and being proportional to a degree of security provided to the data files stored by the storage component, wherein security is associated with unauthorized access;

scanning the storage components to identify a stored first data file for reevaluation of whether the first data file is stored in an appropriate storage component having a security capability that corresponds to a data security rating of the first data file, the data security rating being proportional to a degree of protection from unauthorized access for the first data file;

classifying the first data file to a first category having an assigned data security rating from amongst the defined categories based on one or more attributes associated with the first data file;

determining whether the data security rating which is assigned to the first category and which specifies a degree of protection required for the first data file against unauthorized access is satisfied by a degree of protection provided against unauthorized access as specified by the security capability for a first storage component that stores the first data file; and initiating an operation to secure the first data file, in response to determining the degree of protection required for the first data file against unauthorized access is not satisfied by the degree of protection provided against unauthorized access as specified by the security capability for the first storage component.

10. The method of claim 9, further comprising:

determining the security capability for a second storage component corresponds to the data security rating assigned to the first category, in response to determining the data security rating assigned to the first category does not correspond to the security capability for the first storage component, and wherein the operation to secure the first data file includes storing data of the first data file within the second storage component as a second data file.

11. The method of claim 10, wherein the storing data of the first data file within the second storage component as the second data file includes:

instructing a backup application to resend, to the storage system, the data of the first data file, the backup application directing storage of the data of the first data file to the second data file within the second storage component.

12. The method of claim 9, wherein the defining the categories includes:

providing, as part of a set of inputs for a processing performed by a machine learning component, the attributes associated with the data files stored by the storage system; and receiving, as part of a set of outputs from the processing performed by the machine learning component, the defined categories for classifying data files stored within one or more storage components of a storage system, and the assigned data security ratings for each of the defined categories.

13. The method of claim 12, wherein the defining the categories further includes:

providing, as part of the set of inputs for the processing performed by the machine learning component, an identifier for the industry associated with the first client.

14. The method of claim 12, wherein the defining the categories further includes:

providing, as part of the set of inputs for the processing performed by the machine learning component, the categories or data security ratings used for the different set of data files associated with a second client of the storage system.

15. A computer program product comprising a non-transitory computer-readable medium having a computer-readable program code embodied therein to be executed by one or more processors, the program code including instructions to:

initialize a data distribution policy for a first client of a storage system including defining categories for classifying data files stored within one or more storage components of the storage system by analyzing attributes of the data stored within the one or more storage components, and assigning a data security rating to each of the defined categories, each of the categories describing a group of the data files based on a shared attribute of the data files, wherein defining the categories for classifying the data files associated with the first client is based on at least one of an industry associated with the first client, or categories used for a different set of data files associated with a second client of the storage system;

determine, for each of the storage components, a security capability based on at least one or more network attributes or device attributes associated with the storage component, the security capability being associated with accessibility of the storage component and being proportional to a degree of security provided to the data files stored by the storage component, wherein security is associated with unauthorized access;

scan the storage components to identify a stored first data file for reevaluation of whether the first data file is stored in an appropriate storage component having a security capability that corresponds to a data security rating of the first data file, the data security rating being proportional to a degree of protection from unauthorized access for the first data file;

classify the first data file to a first category having an assigned data security rating from amongst the defined categories based on one or more attributes associated with the first data file;

determine whether the data security rating which is assigned to the first category and which specifies a degree of protection required for the first data file against unauthorized access is satisfied by a degree of protection provided against unauthorized access as specified by the security capability for a first storage component that stores the first data file; and initiate an operation to secure the first data file, in response to determining the degree of protection required for the first data file against unauthorized access is not satisfied by the degree of protection provided against unauthorized access as specified by the security capability for the first storage component.

16. The computer program product of claim 15, wherein the program code includes further instructions to:

determine the security capability for a second storage component corresponds to the data security rating assigned to the first category, in response to determining the data security rating assigned to the first category does not correspond to the security capability for the first storage component, and wherein the operation to secure the first data file includes storing data of the first data file within the second storage component as a second data file.

17. The computer program product of claim 16, wherein the storing data of the first data file within the second storage component as the second data file includes:

instructing a backup application to resend, to the storage system, the data of the first data file, the backup application directing storage of the data of the first data file to the second data file within the second storage component.

18. The computer program product of claim 15, wherein the defining the categories includes:

providing, as part of a set of inputs for a processing performed by a machine learning component, the attributes associated with the data files stored by the storage system; and receiving, as part of a set of outputs from the processing performed by the machine learning component, the defined categories for classifying data files stored within one or more storage components of a storage system, and the assigned data security ratings for each of the defined categories.

19. The computer program product of claim 18, wherein the defining the categories further includes:

providing, as part of the set of inputs for the processing performed by the machine learning component, an identifier for the industry associated with the first client.

20. The computer program product of claim 18, wherein the defining the categories further includes:

providing, as part of the set of inputs for the processing performed by the machine learning component, the categories or data security ratings used for the different set of data files associated with a second client of the storage system.

* * * * *